US009875564B2

United States Patent
Hadfield

(10) Patent No.: US 9,875,564 B2
(45) Date of Patent: Jan. 23, 2018

(54) MAP DISPLAY DEVICE AND MAP DISPLAY METHOD

(71) Applicant: BAE SYSTEMS plc, London (GB)

(72) Inventor: Richard Stephen Hadfield, Rochester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/650,095

(22) PCT Filed: Nov. 27, 2013

(86) PCT No.: PCT/GB2013/053135
§ 371 (c)(1),
(2) Date: Jun. 5, 2015

(87) PCT Pub. No.: WO2014/087135
PCT Pub. Date: Jun. 12, 2014

(65) Prior Publication Data
US 2015/0371421 A1     Dec. 24, 2015

(30) Foreign Application Priority Data

Dec. 7, 2012 (EP) ..................................... 12275192
Dec. 7, 2012 (GB) .................................. 1222026.5

(51) Int. Cl.
*G06T 11/60* (2006.01)
*G06T 11/00* (2006.01)
(Continued)

(52) U.S. Cl.
CPC .............. *G06T 11/60* (2013.01); *G01C 21/00* (2013.01); *G06T 1/20* (2013.01); *G06T 11/00* (2013.01);
(Continued)

(58) Field of Classification Search
CPC ...... H04N 19/86; H04N 19/80; H04N 19/625; H04N 19/124; H04N 19/164; H04N 19/00;
(Continued)

(56) References Cited

U.S. PATENT DOCUMENTS 5,915,077 A * 6/1999 Kulkarni ................ H04N 19/59
358/1.15
2007/0070186 A1* 3/2007 Fujimori .................. H04N 7/15
348/14.03
(Continued)

FOREIGN PATENT DOCUMENTS

JP     S6173012 A    4/1986
JP     2005148906 A  6/2005
(Continued)

OTHER PUBLICATIONS

International Search Report and Written Opinion received for Patent Application No. PCT/GB2013/053135, dated Jan. 27, 2014. 12 pages.
(Continued)

*Primary Examiner* — Tapas Mazumder
(74) *Attorney, Agent, or Firm* — Finch & Maloney PLLC

(57) ABSTRACT

A map display device stores a map image dataset with image pixels including a plurality of static-type pixels each having only one color value, and a plurality of dynamic-type pixels each having a predefined set of color values, and a function definition field which defines a function to select between said color values. A graphics processor processes one tile of map image data by, for each of the dynamic type pixels, retrieving the function identified by the function definition field, applying a current time value to the function, and selecting one of the predefined set of color values according to a result of the function. An output unit outputs the map
(Continued)

image frame as a raster image containing one pixel color value at each of the pixels for display on a display screen.

19 Claims, 4 Drawing Sheets

(51) Int. Cl.
*G09B 29/00* (2006.01)
*G01C 21/00* (2006.01)
*G06T 1/20* (2006.01)

(52) U.S. Cl.
CPC .......... *G06T 11/001* (2013.01); *G09B 29/006* (2013.01)

(58) Field of Classification Search
CPC ........ H04N 19/60; H04N 1/38; H04N 19/895; H04N 19/137; H04N 19/82; H04N 19/61; H04N 19/176; H04N 19/14; H04N 19/18; H04N 19/117; H04N 5/213; G06T 5/00; G06T 5/50; G06T 7/0002
See application file for complete search history.

(56) References Cited

U.S. PATENT DOCUMENTS

| | | | | |
|---|---|---|---|---|
| 2008/0109159 A1* | 5/2008 | Shi | ........................ | G01C 21/32 701/421 |
| 2008/0180282 A1* | 7/2008 | Brosius | .................. | G01C 21/00 340/995.27 |
| 2008/0252652 A1* | 10/2008 | Jiao | ........................ | G06T 15/005 345/582 |
| 2009/0110270 A1* | 4/2009 | Poor | ........................ | G09B 7/02 382/165 |
| 2014/0089639 A1* | 3/2014 | Diewald | ............... | G06F 9/3017 712/215 |

FOREIGN PATENT DOCUMENTS

| | | |
|---|---|---|
| JP | 2007050759 A | 3/2007 |
| KR | 20110092020 A | 8/2011 |
| WO | 2008091574 A1 | 7/2008 |
| WO | 2014087135 A1 | 6/2014 |

OTHER PUBLICATIONS

GB Intellectual Property Office Search Report under Section 17(5) received for GB Patent Application No. 1222026.5, dated May 22, 2013. 5 pages.

Extended European Search Report received for EP Patent Application No. 12275192.8, dated May 10, 2013. 8 pages.

Dorn, Crystal, "Working with Temporal Data in ArcGIS," Esri Regional User Group Conference—Feb. 23-24, 2011. Downloaded from the Internet: URL: http://proceedings.esri.com/library/userconf/cahinvrug11/papers/working_with_temporal_data_in_arcgis.pdf. 37 pages.

Anonymous, "Garmin Pilot (TM). It's the app aviators have been waiting for." Apr. 30, 2012. Downloaded from the Internet: URL: http://www8.garmin.com/aviation/brochures/garmin_pilot.pdf. 2 page.

International Preliminary Report on Patentability and Written Opinion received for Patent Application No. PCT/GB2013/053135, dated Jun. 18, 2015. 8 pages.

* cited by examiner

High Tide     Low Tide

MAP DISPLAY DEVICE AND MAP DISPLAY METHOD

BACKGROUND

Field of the Invention

The present invention relates in general to the field of display devices, and more particularly to a display device which is capable of displaying a map.

Related Art

It is well known to provide an electronic device having a display screen for displaying a map. There is a desire to increase the capabilities and functions of the device, but such functions are restricted by the technical limitations of the device.

There is a general tendency to make the devices more complex and to provide an ever greater range of functions. However, there are still significant technical limitations. For example, a mobile map device which is intended for handheld use should be relatively small and lightweight. As another example, a device which is to be installed in a vehicle may likewise have size and/or weight restrictions.

Thus, there is a need to make efficient use of the hardware resources within the device, including particularly making efficient use of data storage and processing power. There is a particular difficulty when considering legacy hardware, which may be ten or fifteen years behind current leading edge technology but is still in active use.

The example embodiments have been provided with a view to addressing at least some of the difficulties that are encountered in current devices, whether those difficulties have been specifically mentioned above or will otherwise be appreciated from the discussion herein.

SUMMARY OF THE INVENTION

According to the present invention there is provided a map display device, a method and a computer-readable storage medium as set forth in the appended claims. Other, optional, features of the invention will be apparent from the dependent claims, and the description which follows.

At least some of the following example embodiments provide a map display device having improved graphics processing capabilities. There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

In one example, a map display device stores a map image dataset with images including a plurality of static-type pixels each having only one color value, and a plurality of dynamic-type pixels each having a predefined set of color values, and a function definition field which defines a function to select between said color values. A graphics processor processes the map image data by, for each of the dynamic type pixels, retrieving the function identified by the function definition field, applying a current time value to the function, and selecting one of the predefined set of color values according to a function result. An output unit outputs a raster image frame containing one pixel color value at each pixel for display on a display screen.

Thus, the example map display device described herein is capable of performing animated raster cartography, wherein the color of one or more particular pixels within the map image frame is varied as a function of time, with efficient use of resources within the map display device.

In one aspect there is provided a map display device comprising a map data storage unit which stores a map image dataset, a graphics processor which processes map image data taken from the map image dataset to provide a map image frame, and an output unit which outputs the map image frame to be displayed on a display device; the map image data comprises an image formed by a two-dimensional array of pixels, the pixels including a plurality of static-type pixels each having only one color value, and a plurality of dynamic-type pixels each having a predefined set of color values, and a function definition field which defines a function to select between said color values; the graphics processor processes the map image data by, for each of the dynamic type pixels, retrieving the function identified by the function definition field, applying a current time value to the function, and selecting one of the predefined set of color values according to a result of the function; the output unit outputs the map image frame as a raster image containing one pixel color value at each of the pixels.

In one example, the graphics processor retrieves the map image data which is provided in a plurality of image layers, including at least a first image layer which carries a color value for each pixel of the map image data, including a single color value of each said static-type pixel and a first color value of each said dynamic-type pixel, a second image layer which carries a second color value of each said dynamic-type pixels, and at least one function layer which carries the function definition field of the dynamic-type pixels.

In one example, the first image layer is fully populated across the two-dimensional array of pixels, and the second image layer is only partially populated corresponding to a sub-portion of the array covered by the dynamic-type pixels. In one example, the second image layer is partially populated corresponding only to the area covered by the dynamic type pixels.

In one example, a partially populated third image layer carries a third color value of one or more of the dynamic-type pixels. In one example, the second layer and the third layer have different populations. In one example, the function layer is partially populated corresponding to the area of the dynamic-type pixels in the pixel array.

In one example, the function definition field carries one or more parameters which define the output of the function. In one example, the function definition field comprises a function identity field which identifies one amongst a plurality of predetermined functions to be applied to said dynamic-type pixel.

In one example, the function is a time range equation wherein the dynamic-type pixel is determined by a set of time intervals according to:

Use Layer=$(t \geq t_1 \wedge t \leq t_2) \vee (t \geq t_3 \wedge t \leq t_4) \vee \ldots$ where, $[t_1,t_2]$, $[t_3,t_4]$, . . . are time ranges when a given image layer should be chosen.

In one example, the time parameters may be set directly by the parameters which are recorded in the function definition field.

In one example, the function is a periodic function, and the parameters recorded in the function definition field provide relevant parameters for use in processing the periodic function.

In one example, the graphics processor processes the function to provide a function result and compares the function result against the parameters to provide a selection result, and wherein the selection result determines the color value to be selected amongst the set of predetermined color values of said dynamic-type pixel.

In one example, user-defined functions may be provided to represent more complex real world behaviour. In one example, the user-defined functions are derived by observing a stock of raster images used in the map preparation phase.

In one example, the function is a user-defined function which comprises a plurality of user-defined data points within a cyclic time period. In one example, the cyclic time period is user-defined and set in the parameters held by the function definition field.

In one example, one or more of said dynamic-type pixels include a plurality of said function layers. In one example, a first function layer provides a first selection result, which in turn selects a second function layer. The second function layer then determines the selected color value from amongst the relevant image layers. In one example, such 'switched' functions are applied in neighbouring time periods, e.g. providing a periodic behaviour in one time period but providing a user-defined behaviour in another time period.

In one example, the image frame which is produced by the graphics processor is a base image frame as a base layer of the output by the output unit to the display screen. In one example, the graphics processor unit is adapted to perform further graphics processing functions to assemble a final displayed image by combining the base image with one or more overlays.

In one example, the one or more function layers, and/or the individual functions identifiers, are user-selectable. In one example the dynamic function-related behaviour of the dynamic-type pixels is capable to be toggled on or off. In one example, the function layers, and/or the individual functions identifiers, may be individually enabled or disabled (e.g. setting whether or not to display tides dynamically, separately from melt water variations or crop heights).

In one example, the map image dataset represents a geographic area, wherein the map image dataset comprises a plurality of individual tiles or each representing a sub-portion of the total geographic area covered by the map image dataset, and wherein the map image data retrieved by the graphics processor corresponds to one such tile. In one example, the map image frame is a color image of a current portion of the geographic area which is of interest. In one example, the map image dataset is provided in a raster graphics format.

In one aspect there is provided a map display method, comprising: retrieving a section of map image data from a map image dataset; processing the section of map image data to provide a map image frame; and outputting the map image frame to be displayed on a display device; wherein the map image data comprises an image formed by a two-dimensional array of pixels, the pixels including a plurality of static-type pixels each having only one color value, and a plurality of dynamic-type pixels each having a predefined set of color values including at least a first color value and a second color value, and a function definition which defines a function to select between the set of color values; processing the map image data by, for each of the dynamic type pixels, retrieving the function identified by the function definition, applying a current time value to the function, and selecting one of the predefined set of color values according to a result of the function; and outputting the map image frame as a raster image containing one pixel color value at each of the pixels.

In one aspect there is provided a tangible, non-transient computer-readable storage medium having instructions which, when executed, cause a computer device to perform any of the methods defined herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

The example embodiments will be discussed in detail in relation to a map display device which is capable of being installed in a fast-moving vehicle, such as a fast jet aircraft. However, the teachings, principles and techniques of the present invention are also applicable in other example embodiments. For example, the example embodiments are also applicable to other form factors of the device, such as a handheld unit.

Figure 1:
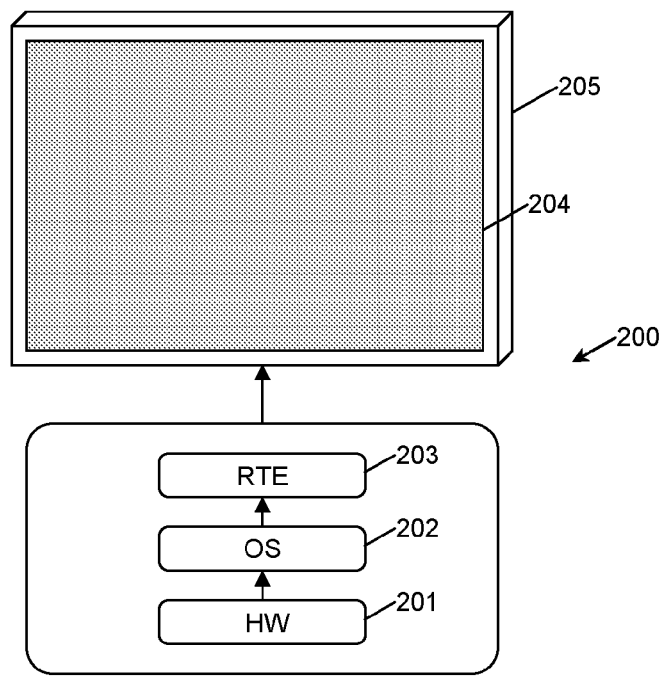
FIG. 1 is a schematic overview of an example map display device.

FIG. 1 is a schematic representation of a map device 200 according to an example embodiment.

In one example, the map device 200 may be installed in the cockpit of an aircraft to provide navigation information to the pilot or navigator. In other embodiments, the map display device is provided as a standalone unit, e.g. in a handheld format, capable of being carried or worn by the user. These and other form factors will be familiar to the skilled person, and the example map display device can be implemented in any suitable physical form.

The map device 200 is suitably provided with a housing, or casing, 205 which exposes a visible display screen 204. The housing 205 may also enclose one or more internal hardware components 201. The map device 200 may be implemented using special-purpose hardware. Alternately, the map device 200 may be implemented using general-purpose hardware which has been adapted to perform the map display functions discussed herein.

Suitably, the map display device 200 includes physical hardware components (H/W) 201 such as memory, non-volatile data storage (e.g. hard disk drive or solid state storage), one or more processors, an internal communications network (e.g. a bus), a power supply (e.g. a local battery or connection to an onboard power supply of the vehicle), and so on. In one example embodiment, the hardware 201 may thus, in use, support an operating system (OS) 202, and a runtime environment (RTE) 203 which executes the map display functions as discussed herein.

Figure 2:
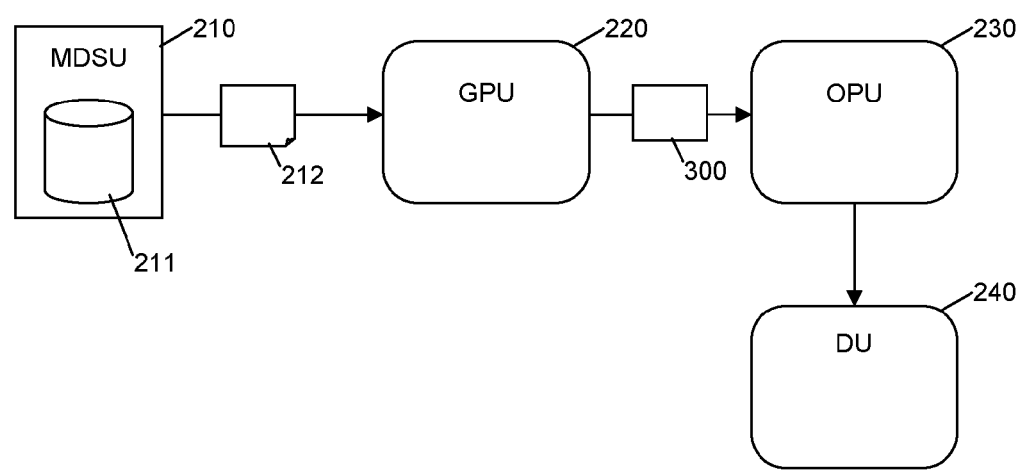
FIG. 2 is a further schematic view of the example map display device.

FIG. 2 is a schematic diagram representing the functional internal components of the example map display device 200 in more detail, including a map data storage unit MDSU 210, a graphics processor unit GPU 220, an output unit OPU 230 and a display unit DU 240. These functional units are implemented using the hardware 201, etc., as mentioned above, as will be appreciated by those skilled in the art from the description herein.

The map data storage unit 210 stores a map image dataset 211 representing a geographic area of interest. In the example embodiments, the map image dataset 211 is conveniently provided in a raster graphics format.

The graphics processor 220 processes map data 212 retrieved from the map data storage unit 210, i.e. by selecting appropriate portions of the map image dataset 211 which are currently of interest. Suitably, the graphics processor 220 processes the retrieved map image data 212 to provide a map image frame 300. The map image frame 300 is suitably a color image of the current portion of the map area which is of interest.

The output unit 230 outputs the map image frame 300 to be displayed by the display unit 240. Suitably, the output unit 230 is arranged to control the visible color image which is output to the user by the display unit 240.

Typically, the map image dataset 211 is prepared in advance by a map preparation device (not shown) and is then loaded into the map data storage unit 210 ready to be used. This map preparation device suitably examines a large number of raster images, such as satellite images, showing the geographic area of interest.

Notably, a large number of images may be available showing the same geographic area at different times or under different conditions. It is desirable to make use of this large existing stock of raster source material, and to maintain backwards capability with previously used raster-based image processing functions.

The graphics processor 220 may have relatively limited processing power, especially considering factors such as the need for small size and low weight in an aircraft or in a handheld unit, or because the graphics processor is implemented by legacy hardware and cannot be readily upgraded or replaced. Thus, there is a need to make efficient use of these limited resources, but to still deliver a high performance. In particular, there is a need to rapidly update the display mapping data and thus to operate quickly and efficiently in preparing the image data ready to be displayed in visible form.

Figure 3:
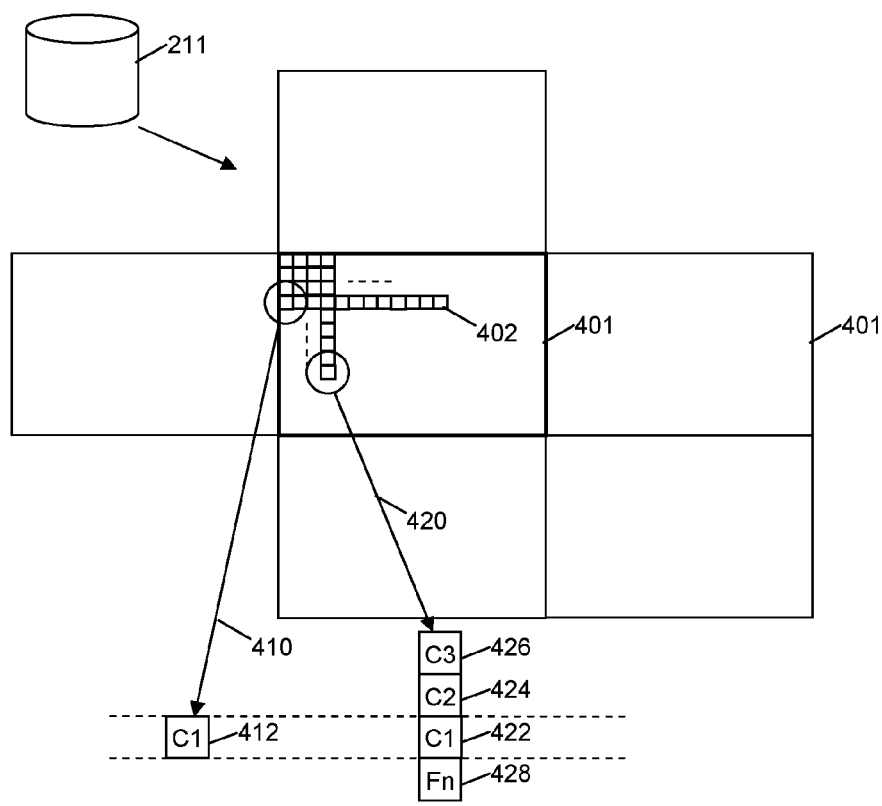
FIG. 3 is a schematic view of a graphics processing function performed by the example map display device.

FIG. 3 is a schematic diagram showing the graphics processing functions of the example map device 200 in more detail. In the example embodiments, the map display device 200 is capable of performing animated raster cartography, wherein the color of one or more particular pixels within the image frame is varied as a function of time.

In the example embodiments, the map image dataset 211 suitably comprises a large plurality of individual tiles or sections 401 each representing a small portion of the total geographic area covered by the map image dataset. The map data 212 retrieved by the graphics 220 suitably corresponds to one such tile 401. Each tile 401 is suitably rectangular and comprises an array of individual pixels 402.

In the example embodiments, the pixels 402 are provided with a plurality of pixel types. In this example, a first type of pixel is a static-type pixel 410 which contains a single color value 412. Suitably, the color value is given in a standard format such as RGB or RGBA (red-green-blue/red-green-blue-alpha). Colour value formats such as RGB, RGBA, YUV and many others will be familiar to the skilled person. The static type pixel 410 having a single color value 420 is thus always has the same color. Meanwhile, at least some of the pixels within this particular tile 401 have a second pixel type, being dynamic-type pixels 420 which are capable of having different colors.

As shown in FIG. 3, the dynamic type pixels 420 are each provided with a plurality of predetermined or predefined color values, in this case including at least a first color value 422, and a second color value 424. A third color value 426 and, optionally, fourth, fifth or more color values may likewise be provided. The dynamic-type pixel 420 is further provided with a function definition field 428. The function definition 428 defines a selection function which is employed in order to select between the plurality of color values 422-426 specified for this particular pixel. That is, the function definition 428 defines the function which will be used by the graphics processor 220 to select amongst the available color values 422-426 when processing the map data 212 (e.g. one tile 401) from the map image dataset 211 to provide the image frame 300.

Figure 4:
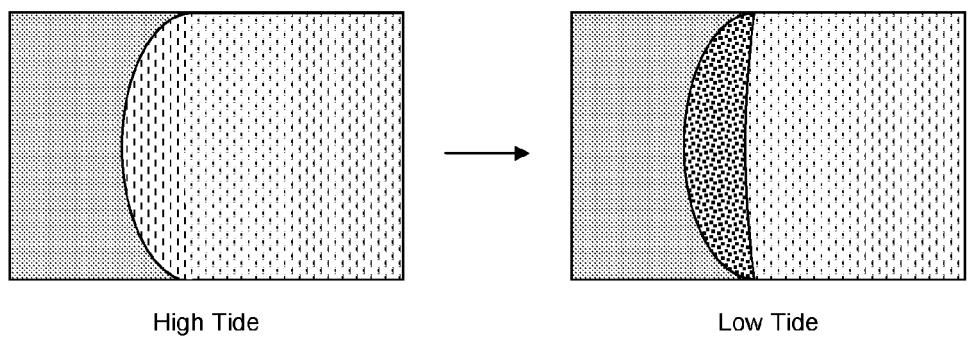
FIG. 4 is a further schematic view of the example graphics processing function.

FIG. 4 is an illustrative example of the image frame 300 as a base image which is produced from the map image dataset by the graphics processor 220. FIG. 4 firstly shows a portion of as coastline at high tide with the sea (shown dark) meeting the land (shown light). FIG. 4 also shows the same section of coastline at low tide, at which time a beach is exposed (shown shaded). Thus some of the pixels always represent land or water and may always have the same color, and thus are represented by the static type pixels 410. However, the beach area is represented using the dynamic type pixels 420 having a first color value (e.g. blue) at a first time representing high tide, and a second color value (e.g. yellow) at a second time representing low tide. Notably, only the varying parts of the image tile 401 are represented using the dynamic type pixels 420 for efficient data storage.

Figure 5:
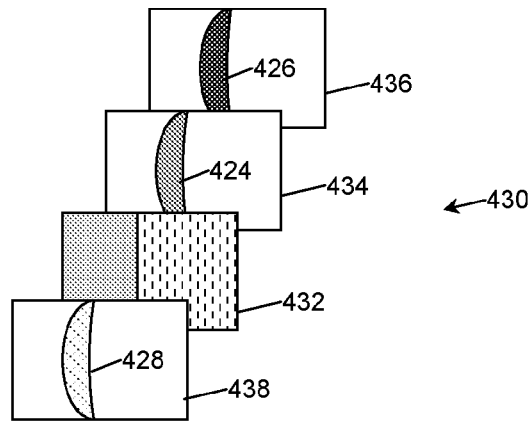
FIG. 5 is a further schematic view of the example graphics processing function.

FIG. 5 is a further illustrative example of the image data as processed by the map display device 200 in use. As shown in FIG. 5, when considering a relevant portion of the map image dataset 211, such as one tile 401, the image data may be provided in a plurality of layers 430. A first color layer 432 carries the first color value C1 for each pixel, i.e. the single color value 412 of each static-type 410 pixel and the first color value 422 of each dynamic-type pixel 420. The first color layer 432 may thus be fully populated.

In the illustrated example, a second color layer 434 carries the second color value 424 of each dynamic pixel 420. In this example, the second color layer 434 is only partially populated, corresponding only to the area covered by the dynamic type pixels 420. A partially populated third color layer 436 carries the third color value 426 of each dynamic pixel 420. The second and third layers may have different populations, depending on the selection function or selection functions being employed (e.g. some dynamic pixels may have a choice between two values, while other dynamic pixels, within in the same tile, enable a choice between three values).

The function definitions 428 are suitably provided in a function layer 438. The function layer 438 in this case is partially populated corresponding to the area of the dynamic-type pixels 410, and is partially empty corresponding to the area of the static type pixels 410.

In the example embodiments, the map image dataset 211 may be stored in a compressed form to reduce the overall size of the stored data. As an example, compression methods familiar to those skilled in the art include palletising, run-length encoding, and LZW compression, amongst many others.

In use, the desired portion of the raster map image dataset 211, i.e. one tile 401, is retrieved from a permanent storage device (e.g. a hard disk drive), and is decompressed or otherwise reconstructed ready for use into the form discussed above.

The graphics processor 220 then implements the function identified by the function definition 428 to select the desired color value of each dynamic pixel 420 at the time of interest. Returning to the tide example, it is well known that tides are periodic and thus tidal behaviour is predictable in relation to time. Therefore, setting a time variable to a particular day and time of day allows the graphics processor 220 to determine, for each dynamic pixel 420, whether to select the first pixel color value C1, e.g. representing dry land, or the second pixel color value C2, e.g. representing water. Extending this example, the pixel color value may be determined relevant to water depth at a particular time, e.g. using yellow for dry land, light blue for shallow water less than say one meter, and dark blue for water depth greater than one meter.

Figure 6:
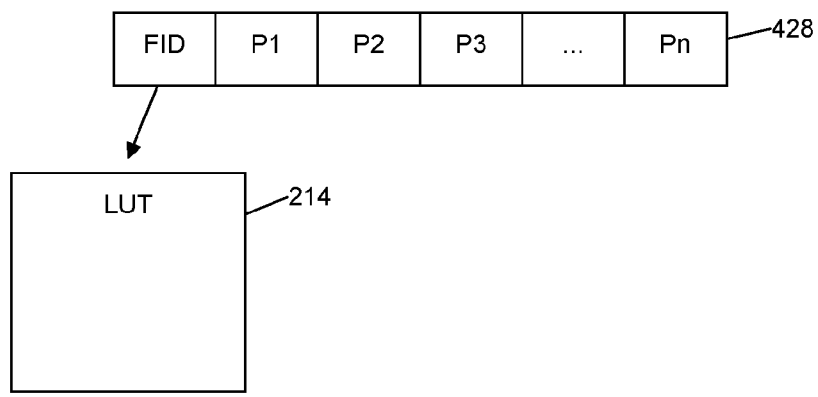
FIG. 6 is a schematic diagram showing function definitions as employed in the example graphics processing function.

FIG. 6 is a schematic diagram showing the function definitions 428 in the function definition layer 438 in more detail. Each function definition 428 suitably includes a function identity field FID, and one or more parameter fields, here including parameters P1, P2, P3, etc. In one example embodiment, the function identity field FID provides an identity of a predetermined function which relates, for example, to a lookup table 214 also stored in the map data storage unit 210. The lookup table 214 may store a plurality of predetermined functions including, for example, a tide function and many other functions.

In one example, the function definition 428 has a function identity field FID which identifies a time range equation. For example, each dynamic pixel is determined by a set of time intervals. This can be summarized as:

Use Layer=$(t \geq t_1 \wedge t \leq t_2) \vee (t \geq t_3 \wedge t \leq t_4) \vee \ldots$ where, $[t_1,t_2]$, $[t_3,t_4]$, . . . are time ranges when a given image layer should be chosen. These time parameters may be set directly by the parameters P1, P2, etc which are recorded in the function definition 428.

As another illustrative example, the FID identifies a periodic tide function as being of interest for this particular dynamic pixel 420. The parameters recorded in the function definition 428 then provide relevant parameters for use in processing this function. Resolving the identified function at a set time point provides a function result (e.g. a water depth value). The function result may be compared against the provided parameters P1, P2, P3 to provide a selection result, and the selection result thus determines the color value to be selected amongst the provided color values 422-426 of this dynamic pixel 420 (e.g. select amongst the available color values by comparing preset depth thresholds given in P1, P2, P3 against the determined current water depth).

In the example embodiments, it will be appreciated that many different periodic features can be modelled using a Fourier sum of cosine functions of time. For a tidal estimation, each of the constituent cosine functions would have an amplitude, frequency and phase, such as:

$h(t)=R_1 \cos(\omega_1 t+\varphi_1)+R_2 \cos(\omega_2 t+\varphi_2)+R_3 \cos(\omega_3 t+\varphi_3)+ \ldots$ where, h(t) is height at time t, $\omega_n$ is frequency, $\varphi_n$ is phase, and $R_n$ is amplitude. A fully-realised tidal equation normally combines 37 such cosine equations.

Figure 7:
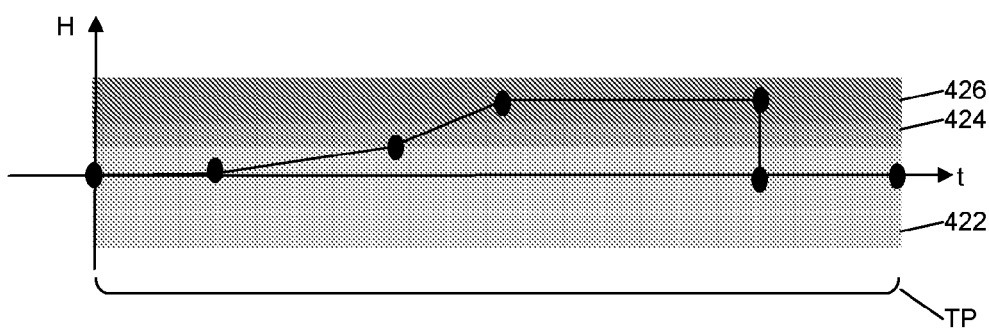
FIG. 7 is a graph as a further illustrative example, wherein user-defined functions may be provided to represent more complex real world behaviour.

FIG. 7 is a graph as a further illustrative example, wherein user-defined functions may be provided to represent more complex real world behaviour. These user-defined functions may be derived by observing the stock of raster images used in the map preparation phase. For example, leaf color or leaf coverage in a forest is observable by comparing satellite images over a year or season. The normal time of leaf fall is thus predictable and can be set using the function definition and identified parameters, allowing the pixels to be displayed, for example, in green when the forest is in leaf, and brown when the leaves have fallen. Likewise, crop growth is highly relevant when traversing arable land on foot, or making an emergency aircraft landing. Other examples of predictable time-variant conditions include melt water flooding, or transient water features such as small lakes which dry significantly during a summer drought but are replenished during a winter rainy season.

In this example, the height H is defined over time t at seven user-defined data points within a cyclic time period TP. These data points may be specified using the parameters P1, P2, etc and the identified function then provides a best-fit curve passing through the user-defined points. This, the crop height can now be determined at any desired time point, and the relevant color value selected.

In a further embodiment, the dynamic-type pixels 420 may include a plurality of function layers. A first function layer may give a first selection result, as described above, which then selects a second function layer. The second function layer then determines the selected color value from amongst the relevant image layers. These 'switched' functions can be applied in neighbouring time periods, e.g. providing a periodic behaviour in one time period but providing a user-defined behaviour in another time period. This indirection thus allows the dynamic behaviour to develop over time.

Figure 8:
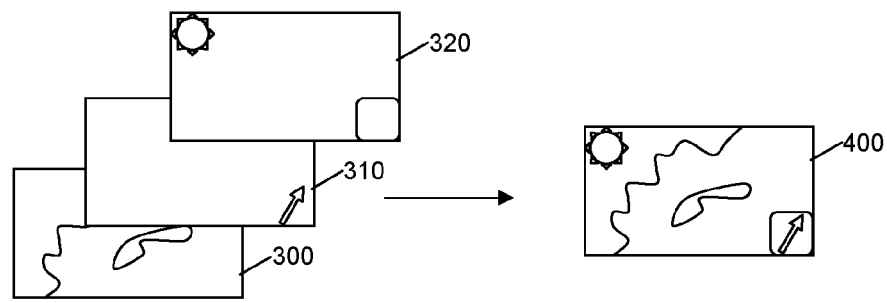
FIG. 8 is a schematic diagram showing the graphics processing functions of the example map device in more detail.

FIG. 8 is a schematic diagram showing the graphics processing functions of the example map device 200 in more detail. In the example embodiments, the image frame which is produced by the graphics processor 220 is a base image frame as a base layer of the output to the display screen. The output unit 230 and/or the graphics processor unit 220 may perform further graphics processing functions as will be familiar to those skilled in the art in order to assemble a final displayed image by combining the base image with one or more overlays, as illustrated in FIG. 8.

FIG. 8 shows the base image 300 being combined, in this example, with a first overlay 310 and a second overlay 320 to produce the final display image 400. For example, the first overlay 310 may display a current directional orientation of the mobile map device 200 or the vehicle in which the device is installed. The second overlap 320 may provide additional onscreen information to supplement the cartographic data being displayed. The map device 200 may thus perform additional downstream graphics processing operations in addition to the animated raster cartography function.

The animated raster cartography function discussed herein may be applied to one, or more, of the overlay images 310, 320. Thus, the base image layer 300 may be used to represent a ground layer with dynamic behaviour, and likewise an overlay image layer 310 may represent cloud cover with time-variable dynamic behaviour. The cloud layer 310 may be derived, for example, from meteorological forecasting and thus representing time events predicted in the near future. The overlay images 310, 320 may be rendered transparent or translucent using the alpha channel (e.g. 50% alpha for light cloud or 80% alpha for heavy cloud).

The function layers 438, or the individual functions identifiers 428, may be user-selectable, thus allowing the dynamic behaviour to be toggled on or off. The function layers 438, or the individual functions identifiers 428, may be individually enabled or disabled (e.g. setting whether or not to display tides dynamically, separately from melt water variations or crop heights).

Figure 9:
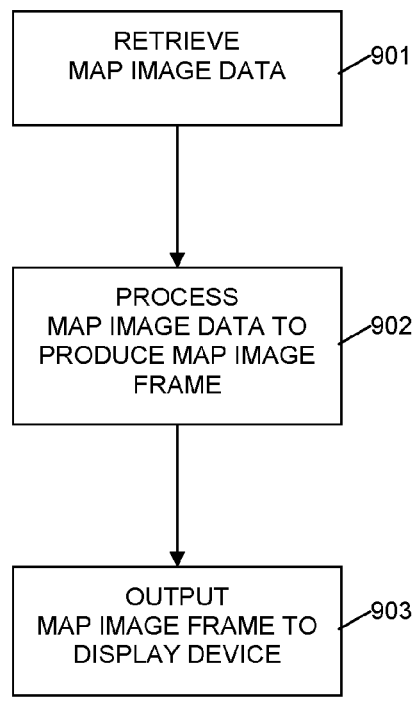
FIG. 9 is a flowchart illustrating an example map display method.

FIG. 9 is a flowchart illustrating an example map display method using the animated raster cartography functions. The method may include the step 901 of retrieving a section of map image data 212 from a map image dataset 211, the step 902 of processing the section of map image data to provide a map image frame, and the step 903 of outputting the map image frame to be displayed on a display device. In this example, the map image data 212 comprises an image layer formed by a two-dimensional array of pixels 401, the pixels including a plurality of static-type pixels 410 each having only one color value 412, and a plurality of dynamic-type pixels 420 each having a predefined set of color values 422-426 including at least a first color value 422 and a second color value 424, and a function definition 428 which defines a function to select between the predetermined color values 422-426 based on a time value. The step 902 includes processing the map image data 212 by, for each of the dynamic-type pixels 420, retrieving the function identified by the function definition 428, applying a current time value to the function, and selecting one of the predefined set of color values 422-426 according to a result of the function. The step 903 includes outputting the map image frame 300 as a raster image containing one pixel color value at each of the pixels 401.

The embodiments above have been described in relation to traditional 2D cartography, similar to a traditional paper map and thus providing image data in a form which is very convenient and reliable for the user. It will be appreciated that the example embodiments provide a lightweight, efficient yet very powerful mechanism for implementing 2D raster cartography which changes over time, to produce animated raster cartography. Thus, considering a handheld unit used in the field, the map device now presents traditional 2D raster cartography, but with map information which changes dynamically in relation to the time of year, or even time of day, in relation to those parts of the map which have been dynamically defined as discussed herein. Further, the same original map dataset is capable of offering multiple different dynamic behaviours simultaneously, by referring to different equations for different dynamic pixel behaviours.

The time-varying nature of the dynamic pixels further allows a series of static images to be generated and displayed in sequence, which illustrate evolution of the cartographic information over time. This is similar to a 'flicker-book' effect, but without needing to store many hundreds or thousands of individual images each representing a different time point.

The animated raster cartography allows the map device to demonstrate time-based dynamic behaviours over long periods, e.g. mapping the evolution of a town or city over tens or hundreds of years. Hence, this efficient mechanism for providing animated raster cartography is expected to be implemented in many different specific cartographic fields.

The example embodiments can also be considered in relation to 3D mapping. A terrain layer may also be associated with each of the base images or tiles 401 to present a 3D image. The terrain layer may store height posts over the area of interest, and the 2D color images are then overlaid by a 3D graphics processor allowing the user to fly through the landscape and gain a greater understanding of the surface topology.

It will be appreciated that animated raster cartography is a powerful feature providing much greater information content in a wide variety of situations, but has been implemented in an efficient and lightweight mechanism which makes best use of available hardware resources.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Although the example embodiments have been shown and described in detail, it will be appreciated by those skilled in the art that various changes and modifications might be made without departing from the scope of the invention, as defined in the appended claims.

The invention claimed is:

1. A map display device, comprising:
a map data storage unit which stores a map image dataset;
a graphics processor operatively connected to the map data storage unit, the graphics processor configured to process map image data taken from the map image dataset to provide a map image frame; and
an output unit operatively connected to the graphics processor, the output unit configured to output the map image frame provided by the graphics processor for display on a display device;
wherein the map image data comprises an image formed by a two-dimensional array of pixels, the pixels including a plurality of static-type pixels each having only one colour value, and a plurality of dynamic-type pixels each having a predefined set of colour values, each of the colour values in the predefined set corresponding to one of a plurality of image layers provided by the map image data, and a function definition field which defines a function to select one of the image layers;
wherein the graphics processor processes the map image data by, for each of the dynamic type pixels, retrieving the function identified by the function definition field, applying a current time value to the function, and selecting one of the predefined set of colour values according to the selected image layer; and
wherein the output unit outputs the map image frame as a raster image containing one pixel colour value at each of the pixels.

2. The device of claim 1, wherein the graphics processor receives the map image data, including at least a first image layer which carries a colour value for each pixel of the map image data, including a single colour value of each said static-type pixel and a first colour value of each said dynamic-type pixel, a second image layer which carries a second colour value of each said dynamic-type pixels, and at least one function layer which carries the function definition field of the dynamic-type pixels.

3. The device of claim 2, wherein the first image layer is fully populated across the two-dimensional array of pixels, and the second image layer is only partially populated corresponding to a sub-portion of the array covered by the dynamic-type pixels.

4. The device of claim 3, wherein a partially populated third image layer carries a third colour value of one or more of the dynamic-type pixels.

5. The device of claim 4, wherein the second layer and the third layer have different populations.

6. The device of claim 3, wherein a partially populated third image layer carries a third colour value of one or more of the dynamic-type pixels, and the function layer is partially populated corresponding to the area of the dynamic-type pixels in the pixel array.

7. The device of claim 2, wherein the function layer is partially populated corresponding to the area of the dynamic-type pixels in the pixel array.

8. The device of claim 7, wherein the function definition field carries one or more parameters which define the output of the function.

9. The device of claim 8, wherein the function definition field comprises a function identity field which identifies one amongst a plurality of predetermined functions to be applied to said dynamic-type pixel.

10. The device of claim 2, wherein one or more of said dynamic-type pixels include a plurality of said function layers.

11. The device of claim 1, wherein the map image dataset represents a geographic area, wherein the map image dataset comprises a plurality of individual tiles or each representing a sub-portion of the total geographic area covered by the map image dataset, and wherein the map image data retrieved by the graphics processor corresponds to one such tile.

12. The device of claim 11, wherein the map image frame is a colour image of a current portion of the geographic area which is of interest.

13. The device of claim 1, wherein the map image dataset is provided in a raster graphics format.

14. A map display method, comprising:
retrieving a section of map image data from a map image dataset, the map image data comprising an image formed by a two-dimensional array of pixels, the pixels including a plurality of static-type pixels each having only one colour value, and a plurality of dynamic-type pixels each having a predefined set of colour values including at least a first colour value and a second colour value, each of the colour values in the predefined set corresponding to one of a plurality of image layers provided by the map image data, and a function definition which defines a function to select one of the image layers;
processing the section of map image data to provide a map image frame;
outputting the map image frame to be displayed on a display device;
processing the map image data by, for each of the dynamic type pixels, retrieving the function identified by the function definition, applying a current time value to the function, and selecting one of the predefined set of colour values according to the selected image layer; and
outputting the map image frame as a raster image containing one pixel colour value at each of the pixels.

15. The method of claim 14, wherein the map image data includes at least a first image layer which carries a colour value for each pixel of the map image data, including the single colour value of each said static-type pixel and the first colour value of each said dynamic-type pixel, a second image layer which carries the second colour value of each said dynamic-type pixels, and at least one function layer which carries the function definition.

16. The method of claim 15, wherein the first image layer is fully populated across the two-dimensional array of pixels, and the second image layer is only partially populated corresponding to a sub-portion of the array covered by the dynamic-type pixels.

17. A non-transitory computer-readable medium having instructions encoded thereon which, when executed by one or more processors, cause a process to be carried out, the process comprising:
retrieving a section of map image data from a map image dataset, the map image data comprising an image formed by a two-dimensional array of pixels, the pixels including a plurality of static-type pixels each having only one colour value, and a plurality of dynamic-type pixels each having a predefined set of colour values including at least a first colour value and a second colour value, each of the colour values in the predefined set corresponding to one of a plurality of image layers provided by the map image data, and a function definition which defines a function to select between the set of colour values;
processing the section of map image data to provide a map image frame;
outputting the map image frame to be displayed on a display device;
processing the map image data by, for each of the dynamic type pixels, retrieving the function identified by the function definition, applying a current time value to the function, and selecting one of the predefined set of colour values according to the selected image layer; and
outputting the map image frame as a raster image containing one pixel colour value at each of the pixels.

18. The computer-readable medium of claim 17, wherein the map image data includes at least a first image layer which carries a colour value for each pixel of the map image data, including the single colour value of each said static-type pixel and the first colour value of each said dynamic-type pixel, a second image layer which carries the second colour value of each said dynamic-type pixels, and at least one function layer which carries the function definition.

19. The computer-readable medium of claim 18, wherein the first image layer is fully populated across the two-dimensional array of pixels, and the second image layer is only partially populated corresponding to a sub-portion of the array covered by the dynamic-type pixels.

* * * * *